(12) United States Patent  
Roberts

(10) Patent No.: US 8,335,297 B2
(45) Date of Patent: Dec. 18, 2012

(54) SYSTEM AND METHOD FOR A TELEPHONE PANIC BUTTON

(75) Inventor: Michael Roberts, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1055 days.

(21) Appl. No.: 12/115,956

(22) Filed: May 6, 2008

(65) Prior Publication Data

US 2009/0279674 A1    Nov. 12, 2009

(51) Int. Cl.
*H04M 11/04*    (2006.01)
(52) U.S. Cl. .......................................................... 379/45
(58) Field of Classification Search ...................... 379/45
See application file for complete search history.

(56) References Cited

U.S. PATENT DOCUMENTS 6,226,510 B1 *   5/2001   Boling et al. .............. 455/404.2
2003/0169852 A1 *   9/2003   Otero .............................. 379/37

* cited by examiner

*Primary Examiner* — Alexander Jamal
(74) *Attorney, Agent, or Firm* — Swanson & Bratschun, L.L.C.

(57) ABSTRACT

Methods for implementing emergency services on a telephony network are presented. A server receives an indication from a telephone handset that a "panic" button has been selected. A call connection is determined and a call is connected based on instructions associated with the emergency call connection. Telecommunication devices for implementing emergency services are also presented. A handset, associated with a location identifier, includes a "panic" button and predetermined emergency call connection instructions are sent/received when the panic button is selected. The telecommunications device may include a database to store information associated with different handsets, a call processor to determine and make emergency call connections over the network when the panic button is selected, and panic logic to store preferences that control how the panic button is implemented on the system.

20 Claims, 4 Drawing Sheets

SYSTEM AND METHOD FOR A TELEPHONE PANIC BUTTON

FIELD OF THE INVENTION

The field of the invention relates in general to telephonic emergency services and, in particular, to emergency call instructions associated with selection of a "panic" button of a telephone handset.

BACKGROUND OF THE INVENTION

The term "Voice over Internet Protocol" ("VoIP") describes the transport of voice over IP based networks, including the Internet. Voice communications may be transported reliably and securely using IP and higher-level protocols, such as Real Time Protocol/Real Time Control Protocol (RTP/RTCP), User Datagram Protocol (UDP), or Transmission Control Protocol (TCP) to transport digitized voice and control signaling. VoIP is increasingly deployed to provide access network solutions. Traditional telephone handsets configured to access Plain Old Telephone Service (POTS) may also be used to access VoIP networks by using Analog Telephone Adaptors (ATA).

Increasingly, VoIP networks are accessed with handsets specifically designed and specially configured for VoIP network interaction capabilities. These handsets include features often found on traditional POTS handsets, such as speakerphone and multi-line conferencing capabilities. Handset keypads usually include "hard keys" and "soft keys." Hard keys are dedicated and hard-coded for a single, unique, consistent purpose. Examples of hard keys include the 12-buttons of the traditional alpha-numeric keypad, the send/end keys commonly found on mobile phones, and buttons to initiate or end a speakerphone function. Soft keys are usually located alongside a display device and may perform different functions dependent on the text shown near the soft keys on the display. Examples of soft keys may include directories and speed dial lists.

Communication is increasingly important when responding to emergencies. What is needed is a way to initiate emergency call connections as an improvement over POTS.

SUMMARY

In one embodiment of the present invention, a packet-based telephony network is used to implement emergency services. A server receives an indication from a first telephone that a "panic" button has been selected. A call connection to a second handset is determined in response to the received indication. The call connection is initiated based on one or more instructions associated with the emergency call connection.

In another embodiment of the present invention, a telecommunications device is used for implementing emergency services on a packet-based telephony network. The telecommunications device may include a database and a call processor. The database stores location identifiers associated with handsets. Each location identifier is associated with one or more other location identifier associated with another handset. The call processor connects calls over the network between handsets. A panic button is disposed on at least one handset and, when the panic button is selected, the call processor connects a call over the network between handsets according to emergency call connection instructions.

In another embodiment of the present invention, a telecommunications device is presented. The telecommunications device may include a handset operable to communicate voice information over a packet-based telephony network. The handset is associated with a location identifier. The handset includes a panic button. When the panic button is selected, the handset sends an emergency indicator. The emergency indicator initiates the execution of emergency call connection instructions by a call server.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

As required, a detailed description of a preferred embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
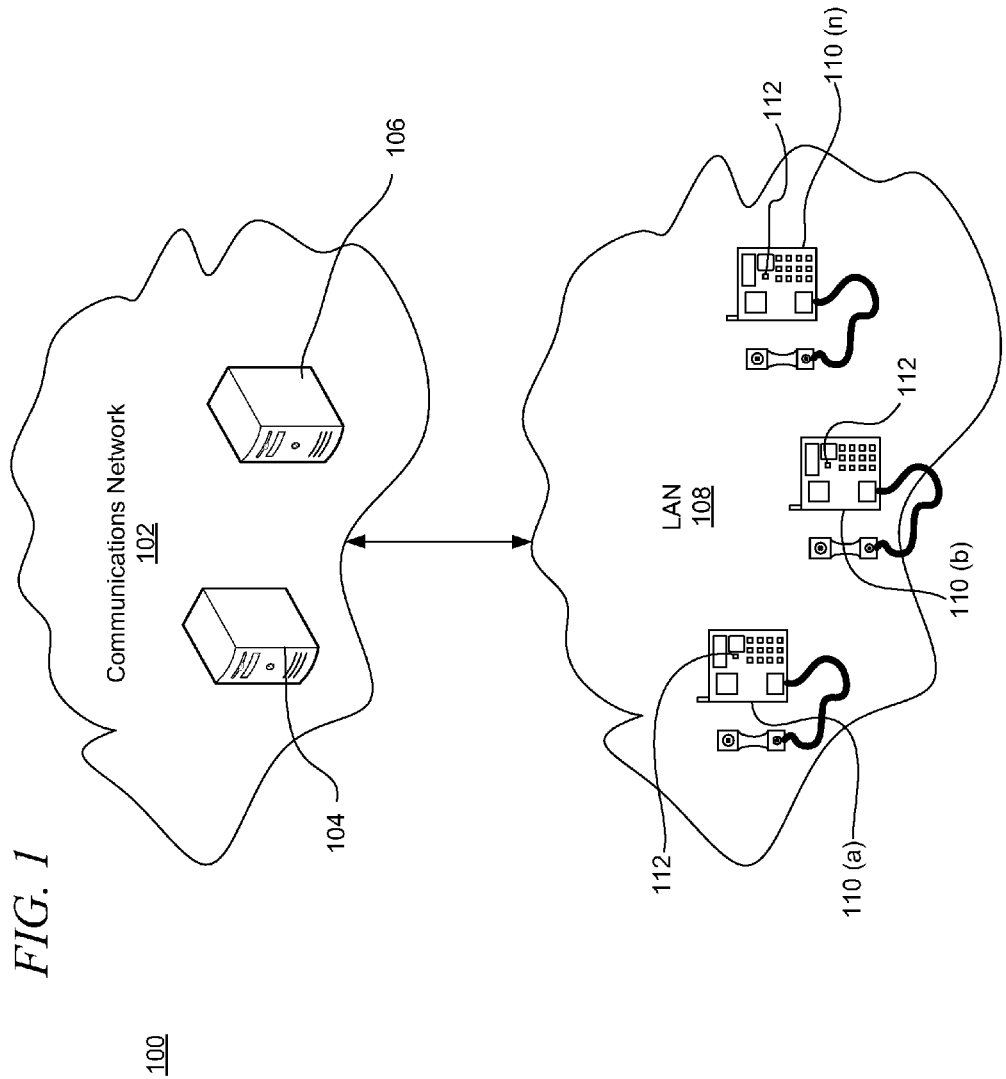
FIG. 1 illustrates a pictorial representation of a communications environment for implementing emergency call connection services according to an illustrative embodiment.

FIG. 1 illustrates a pictorial representation of a communications environment 100 for implementing emergency call connection services according to an illustrative embodiment. The communications environment 100 includes a communications network 102, an application server 104, a feature server 106, a local area network (LAN) 108, and a plurality of handsets 110 (a)-(n) (collectively 110), wherein one or more of the handsets 110 includes a panic button 112. The LAN 108 may be utilized in a school, office or other communications environment. The communications network 102 may enable communication by multiple handsets 110 operably connected to the application server 104, the feature server 106, or a combination of both application servers and feature servers. In FIG. 1, the handsets 110 are also interconnected to each other over the LAN 108.

Instructions relating to the network 102 may be stored on a server. The server may be an application server 104 that is owned and/or maintained by a VoIP service provider and handles one or more of the software, business logic, and data access of the application, such as dial tone and call connection procedures. Alternatively, the server may be a feature server 106 that is owned and/or maintained by a third party and handles one or more of the call-related features, such as call waiting and call forwarding. In one embodiment, instructions associated with the selection of a panic button, such as an instruction to go off-hook and/or an instruction to ring multiple predetermined handsets, may be associated with the application server 104. Other instructions, such as a predetermined ring and/or visual alarm, may be associated with the feature server 106.

The communications network 102 is a system of interconnected telecommunications devices used to facilitate voice and data communication. In one embodiment, the communication network 102 is the public switched telephone network (PSTN). However, the communication network 102 may be any other suitable network. In one embodiment, the local area network (LAN) 108 is an Ethernet network. However, the local area network 108 may be any other network suitable for use in a school or other facility. Either of networks 102 or 108 may be connected to other networks.

For the purposes of this description, the handsets 110 may include a base unit and handpiece that includes a speaker and microphone, where the handpiece may be wired or wireless. In one embodiment, handsets 110 are VoIP telephones. For example, handsets 110 may each comprise a hardware IP phone or may be implemented as a software application within a PC. Alternatively, handsets 110 may be any other suitable handsets such as an analog handset, WiFi handset, cell phone handset, or other suitable voice communications device. In one embodiment, IP telephony calls to and from the handsets 110 are achieved using conventional protocols and methods, such as the session initiation protocol (SIP), whereby a caller coupled to the Internet can conduct a VoIP call with other users.

The handsets 110 may also be connected to the public switched telephone network (PSTN) via conventional methods and devices, for example, via a gateway (not shown) coupled to the Internet connected to the PSTN for routing telephone calls with a plain old telephone system (POTS) user.

In one embodiment, the LAN 108 interconnects handsets 110 in a school. Each room and classroom of the school may include a handset 110. Each handset 110 may includes a soft key, which may be dedicated and labeled as a panic button 112. Each handset 110 may be connected to each other and to the PSTN via an application server 104 and a feature server 106.

When the panic button 112 is selected on any of the handsets 110 (*a*), an emergency call connection is initiated. The emergency call rings directly to one or more other of the handsets 110 (*b*)-110 (*n*), for example in the school administration office. Upon emergency call connection being completed (i.e., when one of the other handsets 110 (*b*)-110 (*n*) picks up), the handset 110 (*a*) goes off-hook and, if speaker functionality is available, may enter into a speaker-phone operation.

The application server 104 and/or feature server 106 may be configured so that certain instructions may be associated with the selection of the panic button 112. One instruction includes utilizing a predetermined "emergency" ring. The emergency ring sounds different than an ordinary ring. For example, a double or triple ring (e.g., two or three short rings), may be utilized for the emergency ring. In this way, a user can audibly recognize when an incoming call on the handset is an ordinary telephone call or an emergency call.

Another instruction includes utilizing a predetermined visual alarm. Predetermined visual information may be displayed on the one or more handsets 110 to identify the location of the handset 110 (*a*) where the panic button 112 is selected. For example, the room number and name of the teacher associated with the handset 110 (*a*) may be displayed on the one or more other handsets 110 (*b*)-110 (*n*).

Figure 2:
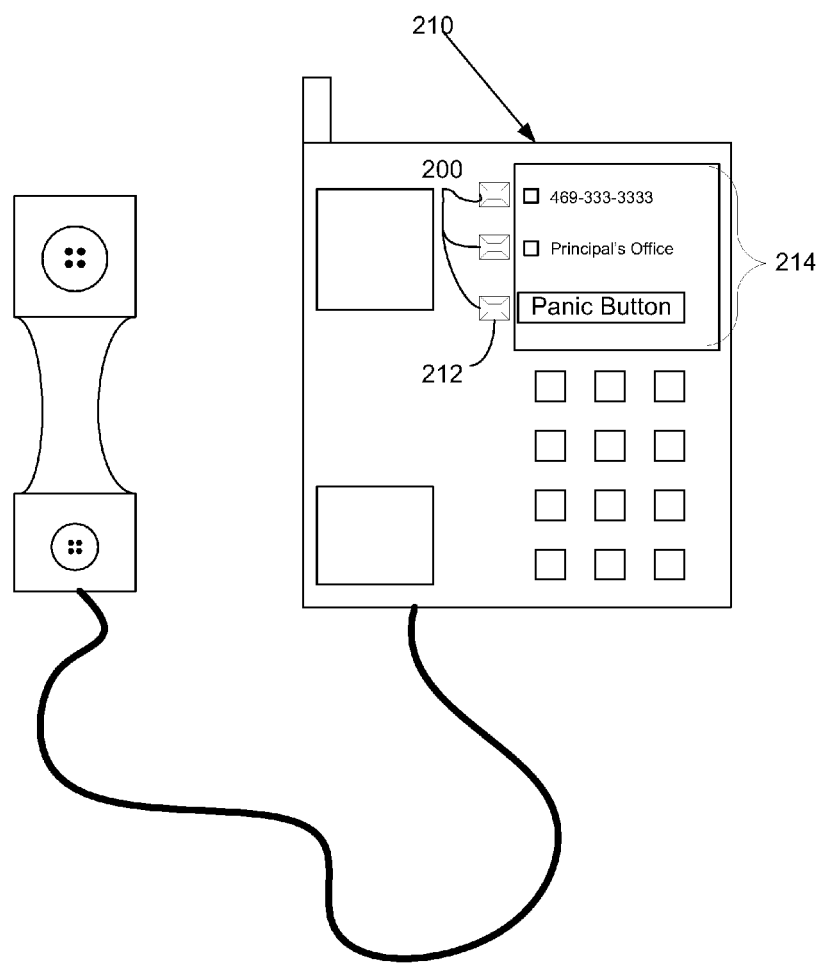
FIG. 2 is a pictorial representation of a Voice over Internet Protocol (VoIP) telephone in accordance with an illustrative embodiment.

FIG. 2 illustrates a pictorial representation of a VoIP phone 210 in accordance with an illustrative embodiment. The VoIP phone 210 is associated with a location identifier. The location identifier is information (e.g., "room 210") identifying the location or position of the VoIP phone 210. The VoIP phone 210 includes several soft keys 200 with a display 214 for displaying text to describe the function of adjacent soft keys 200. Examples may include a soft key dedicated to speed dial a predetermined ten digit telephone number, Principal's office, or otherwise. One of the soft keys 200 is dedicated as a "panic" button 212. In other embodiments, not pictured, the panic button is a hard key.

When the panic button 212 is selected on the VoIP phone 210, an indication is sent to a network server. The indication or indicator is a signal indicating activation of the panic button 212. For example, the indication may be a control signal, dedicated packet, or other information suitable to notify a party receiving the indication that an emergency situation has or is occurring. However, the indication may be any information suitable to notify the server(s) that the panic button 212 has been selected. In response to the indication, a call connection to one or more other handsets may be initiated. One or more instructions for connecting the VoIP phone 210 to other VoIP phones may also be associated with the indication. Once the panic button 212 is selected, a determination may be made to determine to which other VoIP phones the VoIP phone 210 is to connect. For example, a feature server may include an instruction to connect a call to every available telephone line in an administration office when an indication is received that the panic button 212 has been selected. Similarly, an emergency call may be initiated in response to the call connection determination based on the relevant instructions. In one embodiment, a call may be placed to local authorities, such as police or firemen.

In one embodiment, the indication is associated with an instruction for the initiating handset to go off-hook (e.g., speaker-phone) when the emergency call connection is completed so that the user who selected the panic button need not remain near the phone. In another embodiment, the indication may be associated with an instruction for the emergency call connection to be completed regardless of whether the first (initiating) handset is off hook so that the emergency call connection is completed, even if the user who selected the panic button 212 hangs up the handset or deselects the panic button 212. The indication may also be associated with an instruction to establish the connection between the first (initiating) handset and multiple other handsets. Selecting the panic button 212 may connect a user to multiple administrators, security personnel, police, or other first responders simultaneously.

In one embodiment, the selection of the panic button 212 is associated with an instruction to utilize a predetermined ring, and the ring may be associated with an emergency. The predetermined ring may additionally or alternatively be associated with a category of an emergency and/or a location of an emergency. Examples of emergency rings may include a klaxon, a whistle, or a siren.

In one embodiment, the selection of the panic button 212 is associated with an instruction to utilize a visual alarm. The visual alarm may also be associated with an emergency, category of an emergency, location of an emergency, and/or a corresponding action. In another embodiment, the visual alarm is associated with a location and the location is associated with the location of the initiating handset. The visual alarm may be a graphical representation on the display 214 of one or more receiving handsets. In other embodiments, the visual alarm is associated with a specifically designed and dedicated indicator light.

In one embodiment, the VoIP phone 210 includes more than one panic button 212. Each panic button 212 is associated with a different category of emergency. For example, one panic button 212 on the VoIP phone 210 may be associated environmental emergencies, such as a fire or chemical spill. Another panic button 212 may be associated with security-related emergencies, such as an intruder, a missing student, or an outbreak of physical violence (e.g., gun). Another panic button 212 may be associated with medical-related emergencies, such as an injury or illness of one of the staff or students. One skilled in the art can easily recognize that any number of panic buttons 212 (soft key, hard key or a combination of both hard key and soft key) may be included on the VoIP phone 210 and that any number of emergencies may be divided into any number of different categories of emergencies.

In one embodiment, the predetermined ring and/or the number/location of the receiving handset(s) associated with instructions associated with the selection of a panic button of one category of emergency is different from the ring and/or number/location of the receiving handset(s) associated with the instructions associated with the selection of a panic button of another category of emergency. For example, instructions associated with the selection of a "fire" panic button include all of the available lines in the administration office to ring with a "slow whoop" ring and a call connection to also be initiated directly to the local fire department. Instructions associated with the selection of a "medical emergency" panic button include one available line in the administration office and one available line in the nurse's office to ring with a recurring rapid succession of high pitch tones. Instructions associated with the selection of a "security" panic button include all available lines in the administration office, all security stations, and all department head offices to ring with a bi-tonal "European police" siren tone. Another example includes instructions to ring only the nearest administrator, department head and/or security station in response to the selection of a panic button.

In another embodiment, the visual alarm and/or number/location of the receiving handset(s) associated instructions associated with the selection of a panic button of one category of emergency is different from the visual alarm and/or number/location of the receiving handset(s) associated with instructions associated with the selection of a panic button of another category of emergency. For example, instructions associated with the selection of a "fire" panic button include the handset displays in all of the adjacent rooms and in the administration office to show the room number and teacher's name associated with the handset where the "fire" panic button was selected and indicate that a "fire" emergency has occurred. Instructions associated with the selection of a "medical emergency" panic button include a red indicator light on each of the handsets in any one adjacent room, the administration office and the nurse's office to light in recurring rapid succession. Instructions associated with the selection of a "security" panic button include the displays of each of the handsets in the administration office, all security stations, and all department head offices to display the room number and teacher's name associated with the handset where the "security" panic button was selected and indicate that a "security" emergency has occurred. In some embodiments, the instructions include the adjacent rooms to receive only the visual alarm, but not the audible ring.

Figure 3:
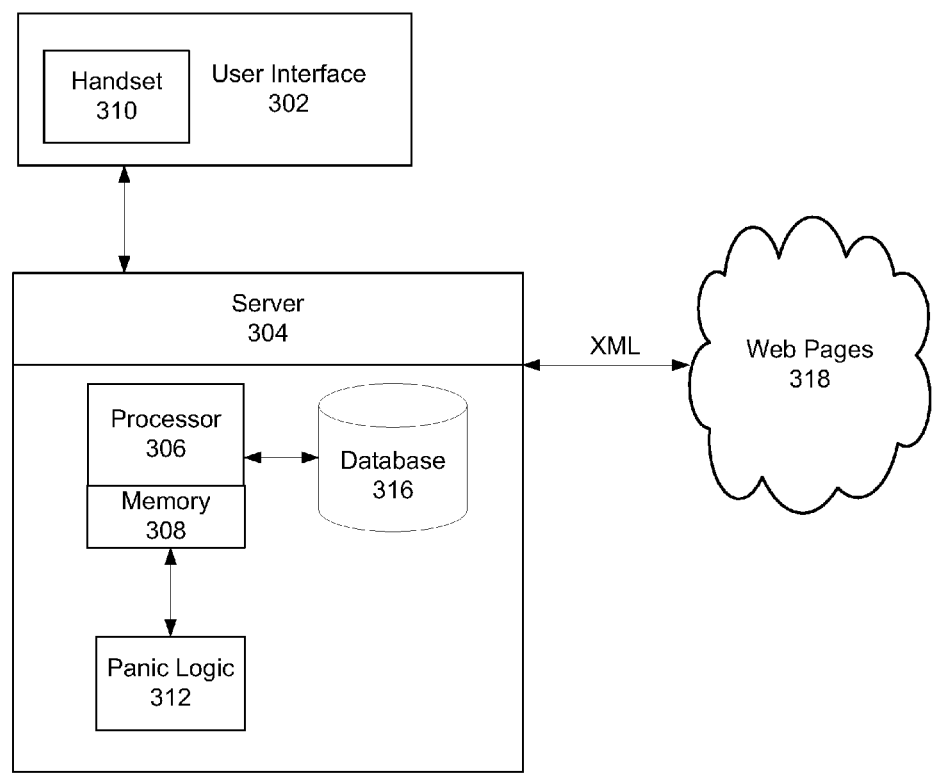
FIG. 3 is a block diagram of a server for processing a panic signal in accordance with an illustrative embodiment.

FIG. 3 illustrates a block diagram of a server 304 for processing a panic button indication received in accordance with an illustrative embodiment. FIG. 3 includes a user interface 302 that communicates with server 304. The user interface 302 may include a software construct by which people (users) interact with a telecommunications device. The user interface 302 includes one or more handsets 310. An example of the handset 310 is the VoIP phone 210 previously described. The server 304 may be an application server, a feature server, or some combination of both application and feature servers. An example of the server 304 is a combination of both the application server 104 and feature server 106, as previously described. The server 304 includes a processor 306, memory 308, at least one database 316, and panic logic 312.

The processor 306 is circuitry or logic enabled to control execution of a set of instructions. The processor 306 may be a microprocessor, digital signal processor, central processing unit, or other device suitable for controlling an electronic device including one or more hardware and software elements, executing software, instructions, programs, and applications, converting and processing signals and information, and performing other related tasks. The processor 306 may be a single chip or integrated with other computing or communications elements.

The memory 308 is a hardware element, device, or recording media configured to store data for subsequent retrieval or access at a later time. The memory 308 may be static or dynamic memory. The memory 308 may include a hard disk, random access memory, cache, removable media drive, mass storage, or other configuration suitable as storage for data, instructions, and information. In one embodiment, the memory 308 and processor 306 may be integrated. The memory may use any type of volatile or non-volatile storage techniques and mediums.

The database 316 is a structured collection of information or data that is stored in a computer system. An example of the database 316 is a list of IP addresses and their related phone numbers and/or physical locations specified by a location identifier. The database 316 may be a separate device or may be integrated with the memory 308.

The database 316 stores location identifiers associated with one or more handset 310. Each location identifier may be associated with a handset 310. The call processor 306 connects calls over a network between handsets 310. A panic button is disposed on at least one handset 310 and, when the panic button is selected, the call processor 306 connects a call over the network between handsets 310 according to emergency call connection instructions stored in the memory 308 on the server 304.

In one embodiment, the server 304 may include the panic logic 312. The panic logic 312 may be discrete digital logic or software logic. The panic logic 312 may store the preferences that control how the panic button may be implemented for one or more handsets including the handset 310.

In one embodiment, the server 304 accesses information from one or more web page 318. The one or more web page 318 is a resource of information that may be accessed by the server 304 via XML (eXtensible Markup Language) over a broadband connection. The one or more web page 318 may include different information relating to different kinds of scenarios in which a panic button may be selected. For example, a web page 318 may include instructions for a display on a handset 310 to repeatedly flash a certain graphic, such as a "policeman" symbol or a "fire" symbol. Where a handset 310 includes a separate panic button for a police, fire, or other emergency, different web pages 318 may be accessed to produce the appropriate graphic on the display of the handset 310. In another example, certain information stored on the database 316, such as the teacher's name and room number, is combined with information on a web page 318, such as instruction to repeated flash a graphic, such that the display of a handset 310 repeatedly flashes the teacher's name and room number in accordance with the instructions associated with the web page 318. Any information accessible via XML may be stored on a web page 318 and accessed by the server 304.

Figure 4:
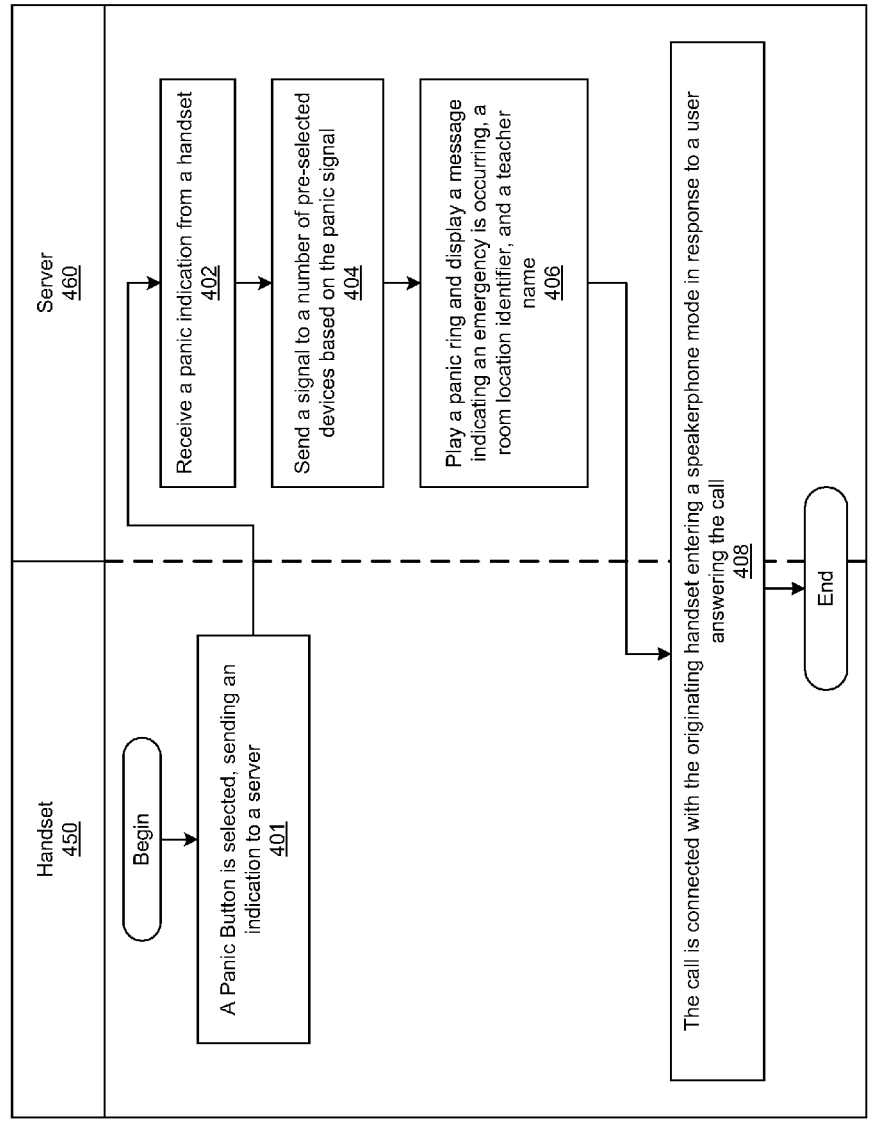
FIG. 4 is a flowchart of a process for implementing a panic button in accordance with an illustrative embodiment.

FIG. 4 illustrates a flowchart of a process for implementing a panic button in accordance with an illustrative embodiment. The process of FIG. 4 may be implemented by a handset 450 and a server, switch, router, or other device configured to enable call management for one or more handsets 450. In step 401, a panic button is selected on a handset and an indication is sent to a server. In step 402, the indication is received from the handset that a panic button has been selected. An emergency call connection to one or more devices is determined based on the indication received in 402. In some embodiments, the device(s) include VoIP, TDM (Time Division Multiplexing), or wireless handsets, email or SMS (Short Message Service) devices.

In step 404, an emergency call connection is initiated to a number of pre-selected devices. In step 406, each of the receiving devices plays a predetermined audible ring, specially associated with the indication received that a panic button has been selected. Also in step 406, in addition to the special "panic" ring, a message is displayed on the display(s) of the receiving device(s) indicating that an emergency is occurring, a room location identifier of the location of the initiating handset, and a teacher name associated with the location identifier of the initiating handset, in the case of the process being utilized in a school. In step 408, the initiating handset (where the panic button was selected) may enter a speaker-phone mode upon selection of the panic button or in response to a call being connected.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall within the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

What is claimed is:

1. A method for implementing emergency services on a local area network, the method comprising:
   receiving, at a server, an indication from a first handset on the local area network that a panic button has been selected on the first handset, the first handset being configured to communicate voice information over the local area network;
   identifying, with the server and in response to the received indication, a second one or more handsets on the local area network with which a connection should be made;
   accessing, with the server, a web site comprising instructions for displaying, on the second one or more handsets, information relating to the indication from the first handset;
   initiating the connection of the call to the identified second one or more handsets, based on one or more instructions associated with an emergency call connection; and
   causing, with the server, the second one or more handsets to display information in accordance with the instructions.

2. The method of claim 1, wherein the received indication is associated with an instruction for the first handset to enter a speaker-phone operation when the call connection is completed.

3. The method of claim 1, wherein the received indication is associated with an instruction for the call connection to be completed regardless of whether the first handset is off-hook.

4. The method of claim 1, wherein the received indication is associated with an instruction to utilize a predetermined ring, the predetermined ring being associated with at least one of: an emergency, a category of an emergency, or a location of an emergency.

5. The method of claim 1, wherein the received indication is associated with an instruction to utilize a visual alarm, the visual alarm being associated with at least one of: an emergency, a category of an emergency, or a location of an emergency.

6. The method of claim 1, wherein the received indication is associated with an instruction to utilize a visual alarm, the visual alarm being associated a location, the location further being associated with the first handset.

7. A telecommunications device for implementing emergency services on a local area network, the telecommunications device comprising:
   a database configured to store at least one originating identifier, the at least one originating identifier being associated with a first handset on a local area network, the first handset being configured to communicate voice information over the local area network, and wherein the at least one originating identifier is associated with at least one destination identifier, the at least one destination identifier being associated with a second handset on the local area network; and
   a call processor configured to:
      receive an indication from the first handset that a panic button has been selected on the first handset;
      identify the second handset based on the at least one destination identifier;
      access a web site comprising instructions for displaying, on the second handset, information relating to the indication from the first handset;
      connect a call over the local area network between the first handset and the second handset in response to emergency call connection instructions; and
      cause the second handset to display information in accordance with the instructions.

8. The telecommunications device of claim 7, wherein the emergency call connection instructions include an instruction for the first handset to enter a speaker-phone operation when the call connection is completed.

9. The telecommunications device of claim 7, wherein the emergency call connection instructions include an instruction for the call connection to be completed regardless of whether the first handset is off-hook.

10. The telecommunications device of claim 7, wherein the emergency call connection instructions include an instruction to establish a connection between the first handset and more than one additional handset.

11. The telecommunications device of claim 7, wherein the emergency call connection instructions include an instruction to utilize a predetermined ring, the predetermined ring being associated with at least one of: an emergency, a category of an emergency, or a location of an emergency.

12. The telecommunications device of claim 7, wherein the emergency call connection instructions include an instruction to utilize a visual alarm, the visual alarm being associated with at least one of: an emergency, a category of an emergency, or a location of an emergency.

13. The telecommunications device of claim 7, wherein the emergency call connection instructions include an instruction to utilize a visual indicator, the visual alarm being associated with a location, the location further associated with the first handset.

14. A telecommunications device comprising:
a handset being operable to communicate voice information over a packet-based local area network including a panic button;
a location identifier associated with the handset,
the handset being configured to send an emergency indicator in response to the selection of the panic button, the emergency indicator being configured to initiate the execution of emergency call connection instructions that communicate the location identifier to at least one other handset on the local area network, wherein the emergency call connection instructions further cause a server to access a web site comprising instructions for displaying, on the at least one other handset, information relating to the emergency indicator.

15. The telecommunications device of claim 14, wherein the emergency call connection instructions include an instruction for the handset to enter a speaker-phone operation when a call connection is completed.

16. The telecommunications device of claim 14, wherein the emergency call connection instructions include an instruction for a call connection to be completed regardless of whether the handset is off-hook.

17. The telecommunications device of claim 14, wherein the emergency call connection instructions include an instruction to utilize a predetermined ring, the predetermined ring being associated with at least one of: an emergency, a category of an emergency, or a location of an emergency.

18. The telecommunications device of claim 14, wherein the emergency call connection instructions include an instruction to utilize a visual alarm, the visual alarm being associated with at least one of: an emergency, a category of an emergency, or a location of an emergency.

19. The telecommunications device of claim 14, wherein the emergency call connection instructions include an instruction to utilize a visual alarm, the visual alarm being associated with the location of the handset.

20. The method of claim 1, wherein the server is not on the local area network, and wherein the first and second handsets communicate with the server over a telephony network.

* * * * *